United States Patent
Bochiechio et al.

(10) Patent No.: US 8,323,559 B2
(45) Date of Patent: Dec. 4, 2012

(54) CRUCIBLE FOR MASTER ALLOYING

(75) Inventors: Mario P. Bochiechio, Vernon, CT (US); John Joseph Marcin, Marlborough, CT (US); Alan D. Cetel, West Hartford, CT (US); Dilip M. Shah, Glastonbury, CT (US); Kevin W. Schlichting, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/940,262

(22) Filed: Nov. 5, 2010

(65) Prior Publication Data
US 2012/0112391 A1    May 10, 2012

(51) Int. Cl.
*C22C 27/00* (2006.01)

(52) U.S. Cl. ......... 266/286; 266/280; 432/262; 432/264

(58) Field of Classification Search ............. 266/280, 266/286; 432/262, 264
See application file for complete search history.

(56) References Cited

U.S. PATENT DOCUMENTS

| | | | |
|---|---|---|---|
| 3,643,728 A | 2/1972 | Hulse | |
| 4,006,891 A | 2/1977 | Ford | |
| 4,190,094 A | 2/1980 | Giamei | |
| 4,557,316 A | 12/1985 | Takayanagi et al. | |
| 5,407,001 A * | 4/1995 | Yasrebi et al. | 164/519 |
| 5,443,789 A | 8/1995 | Harris et al. | |
| 5,500,041 A * | 3/1996 | Debuigne et al. | 106/38.22 |
| 5,922,148 A | 7/1999 | Irvine et al. | |
| 5,931,214 A | 8/1999 | Spicer et al. | |
| 6,500,283 B1 | 12/2002 | Schaeffer et al. | |
| 6,604,941 B2 * | 8/2003 | Billings | 432/265 |
| 6,676,381 B2 | 1/2004 | Subramanian et al. | |
| 7,575,039 B2 | 8/2009 | Beals et al. | |
| 2008/0269041 A1 * | 10/2008 | Kaulius | 501/103 |
| 2009/0205799 A1 | 8/2009 | Elliott et al. | |
| 2010/0000698 A1 | 1/2010 | Newton et al. | |
| 2010/0043999 A1 | 2/2010 | Janz et al. | |

FOREIGN PATENT DOCUMENTS

| | | |
|---|---|---|
| DE | 69416762 | 11/1999 |
| EP | 1990593 | 11/2008 |
| JP | 63014080 | 1/1988 |
| JP | 1083569 | 3/1989 |
| JP | 3223414 | 10/1994 |

OTHER PUBLICATIONS

European Search Report dated Feb. 1, 2012 for EP No. 11187917.7.

* cited by examiner

*Primary Examiner* — Scott Kastler
(74) *Attorney, Agent, or Firm* — Carlson, Gaskey & Olds PC

(57) ABSTRACT

A crucible includes a composite of least two materials. The two materials are selected from a group consisting of alumina, calcia, yttria, erbia, gadolinia, magnesia, hafnia, and zirconia in a composition that has better resistance to reaction with hafnium from a molten hafnium-containing alloy than a nominal crucible composition of 70 wt % magnesia and 30 wt % alumina.

11 Claims, 1 Drawing Sheet

CRUCIBLE FOR MASTER ALLOYING

BACKGROUND

This disclosure relates to crucibles and crucible linings, used for the manufacturing of master alloys.

Superalloy ingot materials for casting processes are typically fabricated in a master alloying process. The process involves placing virgin elements, revert alloy, or any combination there in of materials that comprise the alloy into a crucible. These materials are then subsequently heated in such a manner to produce a homogenous molten alloy with the desired composition. Impurities may also be removed during the process, through chemical or physical means such as by desulphurization and commercially available molten metal filters. After establishing homogeneity, the molten alloy is then transferred from the crucible into an ingot tube. In some cases a tundish is employed to control the distribution of molten metal in to the ingot tubes. The solidified ingot is then subsequently processed for use at the casting furnace. The process can also be used to directly cast the master melted alloy chemistry directly into an investment cast, permanent mold, or other suitable vessel to contain the molten metal.

SUMMARY

An example crucible includes a composite of at least two materials. The two materials are selected from a group consisting of alumina, calcia, yttria, erbia, gadolinia, magnesia, hafnia, and zirconia. Disclosed is a composition that has better resistance to reaction with hafnium from a molten hafnium-containing alloy than a nominal crucible composition of 70 wt % magnesia and 30 wt % alumina.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
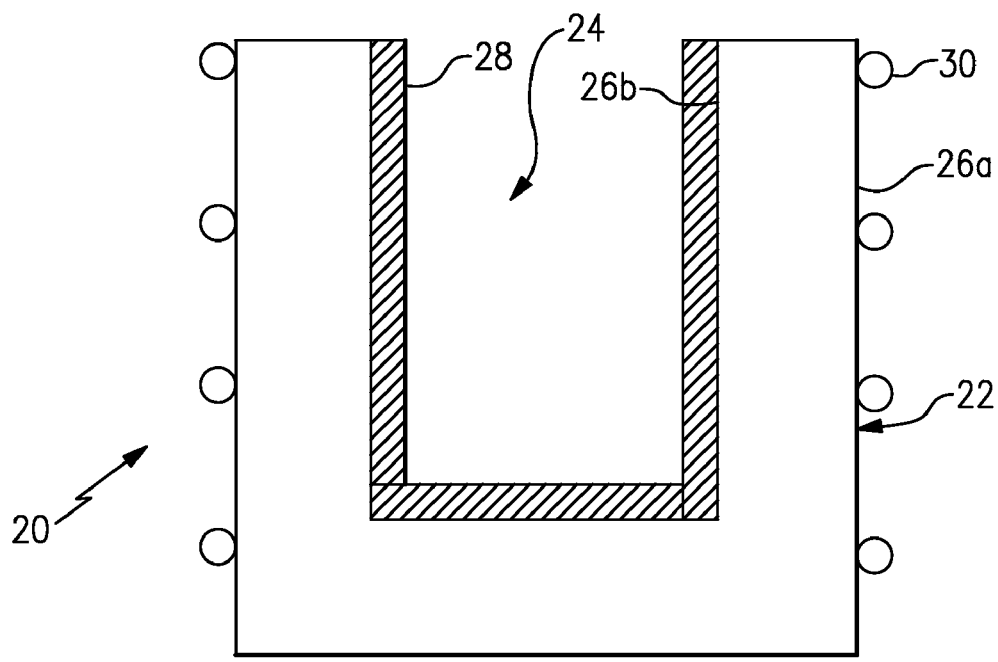
FIG. 1 illustrates an example ceramic crucible that includes a composite material of a composition having good resistance to reaction with hafnium.
Figure 2:
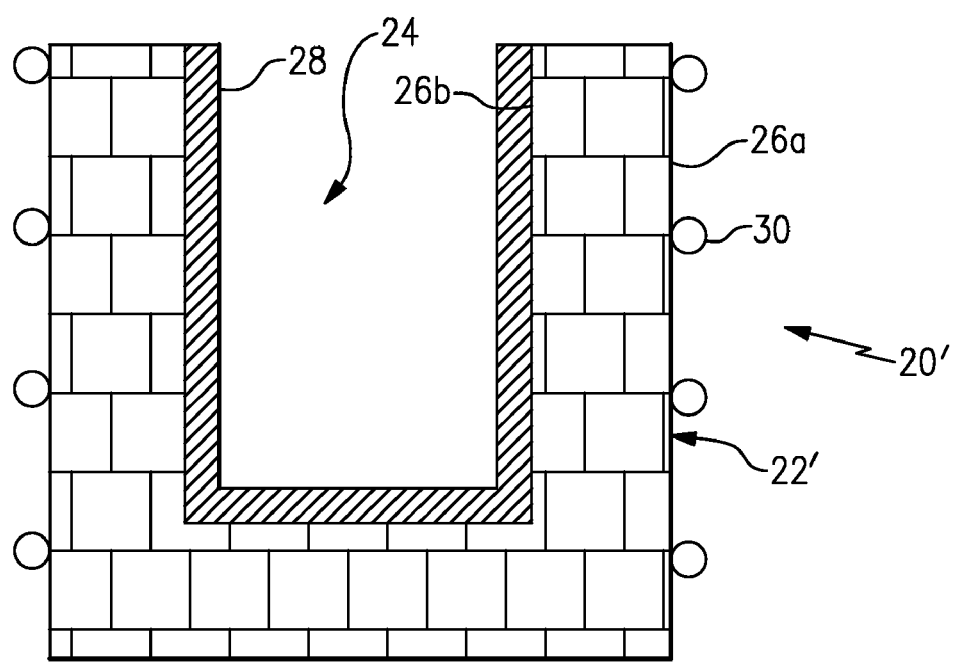
FIG. 2 illustrates an example refractory brick lined crucible that includes a composite material of a composition having good resistance to reaction with hafnium.

FIGS. 1 and 2 illustrate selected portions of example vessels 20 and 20' that may be used for master alloying processes, such as to mix alloy compositions and/or remove impurity elements (e.g., desulfurization). As will be described, the vessels 20 and 20' have better resistance to reaction with hafnium from a molten hafnium-containing alloy than a standard ceramic crucible having a nominal composition of approximately 70 wt % magnesia and 30 wt % alumina.

The alloy may be a nickel-based superalloy and the hafnium may be present in an amount of approximately 0.1-10 wt %, but most commonly is present in an amount of 0.1-2 wt %. Hafnium (hafnium metal, hafnia, or both) from a batch of molten hafnium-containing alloy may leach into a standard crucible or crucible lining and react with the crucible material. During subsequent processing of another batch of non-hafnium alloy in the standard crucible, the hafnium may leach out of the crucible material and into the subsequent batch to thereby alter or contaminate the composition of the subsequent batch rendering it out of specification. In this regard, the exemplary vessels 20 and 20' include a composite material in a composition that has better resistance to chemically reacting with hafnium than the standard crucible such that poisoning of the subsequent batches through the reaction and leaching of hafnium is reduced or even substantially eliminated, as detected through known techniques for determining alloy composition. Additionally, the exemplary vessels 20 and 20' may be used in combination with other techniques, such as "late addition" charging of hafnium into the vessels 20 and 20', to reduce the overall reaction time at temperature reducing the reaction and leaching of hafnium. For instance, the hafnium may be added to the molten alloy is not at the processing temperature (e.g., 2500-2750° F. or 1371-1510° C.) for more than thirty minutes after the addition of the element. The vessels 20 and 20' also is not subject to a high rate of degradation from the reactions with hafnium.

In FIG. 1, the vessel 20 includes a crucible 22 that has an interior space 24 for holding the raw materials for making an alloy and the molten alloy. In general, the crucible 22 is shaped like a cup or ladle. However, the crucible 22 may be designed with other geometries and components, such as heating/cooling mechanisms, to suit the particular needs of an application.

The crucible 22 includes an exterior surface 26a and an interior surface 26b with regard to the interior space 24 where the alloy is processed. In the example, the crucible 22 includes a liner 28 that is located adjacent to the interior surface 26b. Induction coils 30 generally surround the crucible 22 to heat the interior space 24. The liner 28 is made of the composite material that is resistant to reaction with hafnium. The liner 28 may be a coating or layer that is applied onto the crucible 22. For instance, the crucible 22 may include a non-reactive refractory material, such as alumina, magnesia, combinations thereof, or other material that has a different composition from the composite material of the liner 28, and that serves as a substrate for the liner 28. The refractory material may be a solid, monolithic wall in the form of the crucible 22 or refractory bricks that are assembled into the shape of the crucible 22', as shown in the modified vessel 20' of FIG. 2 for example. The liner 28 may be applied onto the crucible 22 using known coating or powder processing techniques, such as slurry spray processing.

Alternatively, the crucible 22 may be a monolithic article that does not include the liner 28 but instead is made of the composite material that is resistant to reaction with hafnium. A user may manufacture the crucible 22 using known processing techniques, such as slip casting, dry pressing, or isostatic pressing.

The composite material that is resistant to reaction with hafnium includes at least two materials from the group containing: alumina ($Al_2O_3$), calcia (CaO), yttria ($Y_2O_3$), erbia ($Er_2O_3$), gadolinia ($Gd_2O_3$), magnesia (MgO), hafnia ($Hf_2O$), and zirconia ($Zr_2O_3$) in a composition. This material has better resistance to reaction with hafnium from a molten hafnium-containing alloy than a nominal crucible composition of approximately 70 wt % magnesia and 30 wt % alumina. In some examples, the composite material includes at least three or at least four of the materials to provide the resistance to reaction with hafnium.

A few examples of ternary composite material include calcia/magnesia/alumina, yttria/magnesia/alumina, yttria/calcia/alumina, yttria/zirconia and one of alumina, calcia, or magnesia, and any two of the above-listed materials and hafnia.

A few examples of quaternary composite materials include yttria/gadolinia/zirconia and one of alumina, calcia, or magnesia, and any three of the above-listed material and hafnia.

As an example, the materials of the composite are selected based on stability with regard to the free energy of reaction (e.g., Ellingham diagram for oxide formation). In that regard, hafnium metal would be expected to react with relatively low-stability oxides of a crucible to preferentially form hafnium oxide. However, if at least a portion of the composite material is composed of a highly stable material, the crucible becomes more resistant to reaction with the hafnium. Yttria and calcia are examples of highly stable oxides that reduce the tendency of hafnium metal to react and form hafnium oxide.

The following examples illustrate additional compositions.

Binary Composite Materials

The composite material may be a binary composite that includes yttria, and the yttria may be present in an amount greater than 10 wt %. In one example, the composite material includes greater than 10 wt % yttria and a balance of alumina.

Alternatively, the composite material is a binary composite of calcia and alumina, and the calcia is present in an amount greater than 65 wt %.

In another alternative, the composite material may be yttria stabilized zirconia ("YSZ"), and the yttria may be present in an amount of 6-9 wt %.

In another example, the composite material is a binary composite of any of the listed materials and hafnia, and the hafnia may be present in an amount of at least 10 wt %. The presence of hafnia in the composite material reduces the concentration gradient of hafnium between the composite material and the hafnium-containing alloy such that there is a reduction of diffusion of hafnium metal into the composite material for reaction.

Ternary Composite Materials

The composite material may be a ternary composite. For example, the composite material may include three materials of calcia, yttria, magnesia, and alumina. For instance, the composite material includes yttria, magnesia and alumina such that the composite material includes less than 20 wt % yttria, less than 20 wt % magnesia, and a balance of alumina. The composite material may alternatively be alumina, yttria, and calcia such that the composite material includes less than 20 wt % yttria, less than 20 wt % calcia, and a balance of alumina. Alternatively, the composite material is calcia, magnesia, and alumina such that the composite material includes less than 20 wt % calcia, less than 20 wt % magnesia, and a balance of alumina.

In another example, the composite material may include yttria, zirconia, and at least one of alumina, calcia, or magnesia. For instance, the yttria may be present in an amount of 6-9 wt % based on the combined weight of the yttria and zirconia.

Quaternary Composite Materials

The composite material may be a quaternary composite. For example, the composite material may include yttria, zirconia, and gadolinia with any of alumina, calcia, hafnia, or magnesia.

Additionally, in any of the above binary, ternary, or quaternary examples that include yttria, the elements gadolinia, zirconia, or both may be used with the yttria or even substituted for the yttria. For instance, the combined amount of yttria, gadolinia, and zirconia is greater than 10 wt %.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed:

1. A vessel for master alloying, the vessel comprising:
a crucible including a composite of at least two materials selected from a group consisting of alumina, calcia, yttria, magnesia, and zirconia in a composition that has better resistance to reaction with hafnium from a molten hafnium-containing alloy than a nominal crucible composition of 70wt % magnesia and 30wt % alumina, the composition being one of a binary composition of yttria and alumina including greater than 10wt % of the yttria, a ternary composition of yttria, magnesia and alumina, a ternary composition of alumina, yttria and calcia including less than 20wt % each of the yttria and the calcia and a balance being the alumina, a ternary composition of calcia, magnesia and alumina including less than 20wt % each of the calcia and the magnesia and a balance being the alumina, a ternary composition of yttria, zirconia and magnesia, and a ternary composition of yttria, zirconia and magnesia including 6-9wt % of the yttria.

2. The vessel as recited in claim 1, wherein the crucible includes a liner that is formed of the composite.

3. A vessel for master alloying, the vessel comprising:
a crucible including a composite of at least two materials selected from a group consisting of alumina, calcia, erbia, gadolinia, magnesia and hafnia in a composition that has better resistance to reaction with hafnium from a molten hafnium-containing alloy than a nominal crucible composition of 70wt % magnesia and 30wt % alumina, wherein the composite includes hafnia.

4. A vessel for master alloying, the vessel comprising:
a crucible including a composite of at least two materials selected from a group consisting of alumina, calcia, yttria, erbia, gadolinia, magnesia, hafnia, and zirconia in a composition that has better resistance to reaction with hafnium from a molten hafnium-containing alloy than a nominal crucible composition of 70wt % magnesia and 30wt % alumina, wherein the composite includes at least two materials selected from a group consisting of yttria, erbia, and gadolina.

5. A vessel for master alloying, the vessel comprising:
a crucible including a liner that is made of a composite of least two materials selected from a group consisting of alumina, yttria, magnesia, and zirconia in a composition, the composition being one of a ternary composition of yttria, magnesia and alumina, a ternary composition of yttria, zirconia and magnesia, and a ternary composition of yttria, zirconia and one of alumina and magnesia including 6-9wt % of the yttria.

6. A vessel for master alloying, the vessel comprising:
a crucible including a composite of alumina and yttria in a composition that has better resistance to reaction with hafnium from a molten hafnium-containing alloy than a nominal crucible composition of 70wt % magnesia and 30wt % alumina, wherein the composition is a binary composition of the yttria and the alumina including greater than 10wt % of the yttria.

7. A vessel for master alloying, the vessel comprising:
a crucible including a composite having a ternary composition of yttria, magnesia and alumina that has better resistance to reaction with hafnium from a molten hafnium-containing alloy than a nominal crucible composition of 70wt % magnesia and 30wt % alumina.

8. The vessel as recited in claim 1, wherein the composition is the ternary composition of alumina, yttria and calcia including less than 20wt % each of the yttria and the calcia and a balance being the alumina.

9. The vessel as recited in claim 1, wherein the composition is the ternary composition of calcia, magnesia and alumina including less than 20wt % each of the calcia and the magnesia and a balance being the alumina.

10. The vessel as recited in claim 1, wherein the composition is the ternary composition of yttria, zirconia and magnesia.

11. The vessel as recited in claim 1, wherein the composition is the ternary composition of yttria, zirconia and magnesia including 6-9wt % of the yttria.

* * * * *